Oct. 2, 1923.

G. A. RICHARDS, JR 1,469,535

TOLL COLLECTING MECHANISM

Filed Jan. 25, 1922          8 Sheets-Sheet 1

INVENTOR.
George A. Richards Jr.
BY Horatio E. Bellows
ATTORNEY

Oct. 2, 1923.　　　　　　　　　　　　　　　　　　　1,469,535
G. A. RICHARDS, JR
TOLL COLLECTING MECHANISM
Filed Jan. 25, 1922　　　　　8 Sheets-Sheet 3

Fig. 4.

INVENTOR.
George A. Richards Jr.
BY Horatio E. Bellows
ATTORNEY

Oct. 2, 1923.

G. A. RICHARDS, JR 1,469,535

TOLL COLLECTING MECHANISM

Filed Jan. 25, 1922    8 Sheets-Sheet 4

INVENTOR.
George A. Richards Jr.
BY Horatio E. Bellows
ATTORNEY

Oct. 2, 1923.

G. A. RICHARDS, JR 1,469,535

TOLL COLLECTING MECHANISM

Filed Jan. 25, 1922    8 Sheets-Sheet 5

INVENTOR.
George A. Richards Jr.
BY Horatio E. Bellows
ATTORNEY

Oct. 2, 1923.

G. A. RICHARDS, JR

1,469,535

TOLL COLLECTING MECHANISM

Filed Jan. 25, 1922    8 Sheets-Sheet 6

INVENTOR.
George A. Richards Jr.
BY Horatio E. Bellows
ATTORNEY

Oct. 2, 1923.

G. A. RICHARDS, JR 1,469,535

TOLL COLLECTING MECHANISM

Filed Jan. 25, 1922    8 Sheets-Sheet 7

INVENTOR.
George A. Richards Jr.
BY Horatio E. Bellows
ATTORNEY

Oct. 2, 1923.

G. A. RICHARDS, JR

1,469,535

TOLL COLLECTING MECHANISM

Filed Jan. 25, 1922      8 Sheets-Sheet 8

INVENTOR.
George A. Richards Jr.
BY Horatio E. Bellows
ATTORNEY

Patented Oct. 2, 1923.

1,469,535

UNITED STATES PATENT OFFICE.

GEORGE A. RICHARDS, JR., OF PROVIDENCE, RHODE ISLAND.

TOLL-COLLECTING MECHANISM.

Application filed January 25, 1922. Serial No. 531,570.

*To all whom it may concern:*

Be it known that I, GEORGE A. RICHARDS, Jr., a citizen of the United States, residing at Providence, in the county of Providence and State of Rhode Island, have invented certain new and useful Improvements in Toll-Collecting Mechanisms, of which the following is a specification.

My invention relates to toll collecting devices and is adapted for the reception of fees at the entrances of cars, places of amusement, and elsewhere.

The essential objects of my invention are to enable the mechanism to be operated by the patron and dispense with the services of an attendant or conductor; to make admission dependent upon the deposit of a fee; to prevent the admission of a plurality of patrons by the payment of a single fee; to register the number of paid admissions; to automatically deliver to the patron the change of a coin of greater denomination than the correct fee; to prevent unlawful access to the collected coins; and to attain these ends in a simple, inexpensive, compact, strong and accurately operable mechanism.

Other objects and advantages of my invention will be apparent from the following description when considered in connection with the accompanying drawings illustrating a preferred embodiment thereof.

To the above enumerated and indicated ends essentially my invention consists in such parts and in such combinations of parts as fall within the scope of the appended claims.

For the purpose of illustrating my invention I have shown in the accompanying drawings which form a part of this specification, a toll collecting mechanism embodying my invention, in which:

Figure 1 is a perspective view of a turnstile and the encased mechanism cooperating therewith, Figure 2, a partial horizontal section of the same, showing the casing for the mechanism in plan, Figure 3, a front elevation of my device with the upper front portion of the casing removed, Figures 4 and 5, sections of the same on line 4—4 of Figure 3 showing the mechanisms in different positions of operation, Figure 6, a detail view of the operating slide, Figure 7, a section on line 7—7 of Figure 4, Figure 8, an isometric view of the bolt and adjacent mechanism, Figure 9, a section on line 9—9 of Figure 4, Figures 10 and 11, isometric rear views of the bolt and socket showing the former in seated and unseated positions respectively, Figures 12 and 13, sections on lines 12—12 of Figure 4, and 13—13 of Figure 7 respectively, Figure 14, a fragmentary diagrammatic isometric view of the bolt and its adjacent cooperating parts, and Figures 15 and 16, isometric views of the under sides of two coin ejecting slides.

Like reference characters indicate like parts throughout the views.

Figure 1:
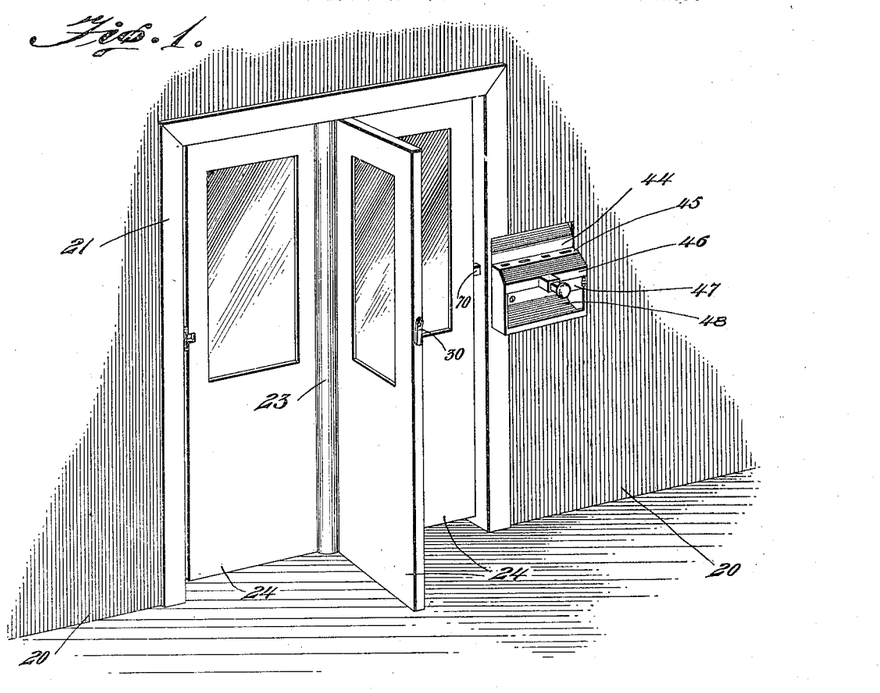
Figure 2:
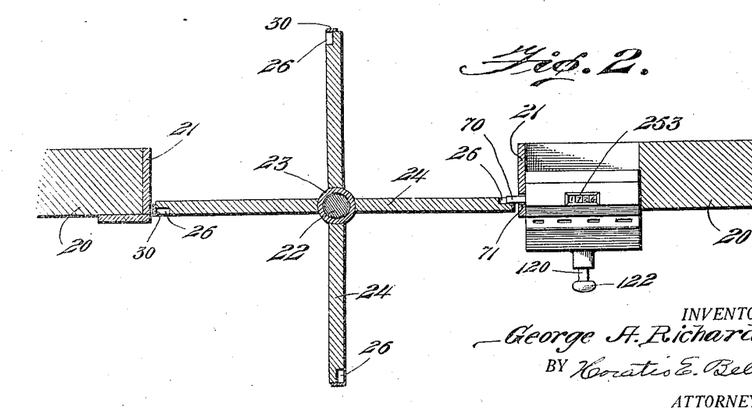
Figures 9, 10, 11:
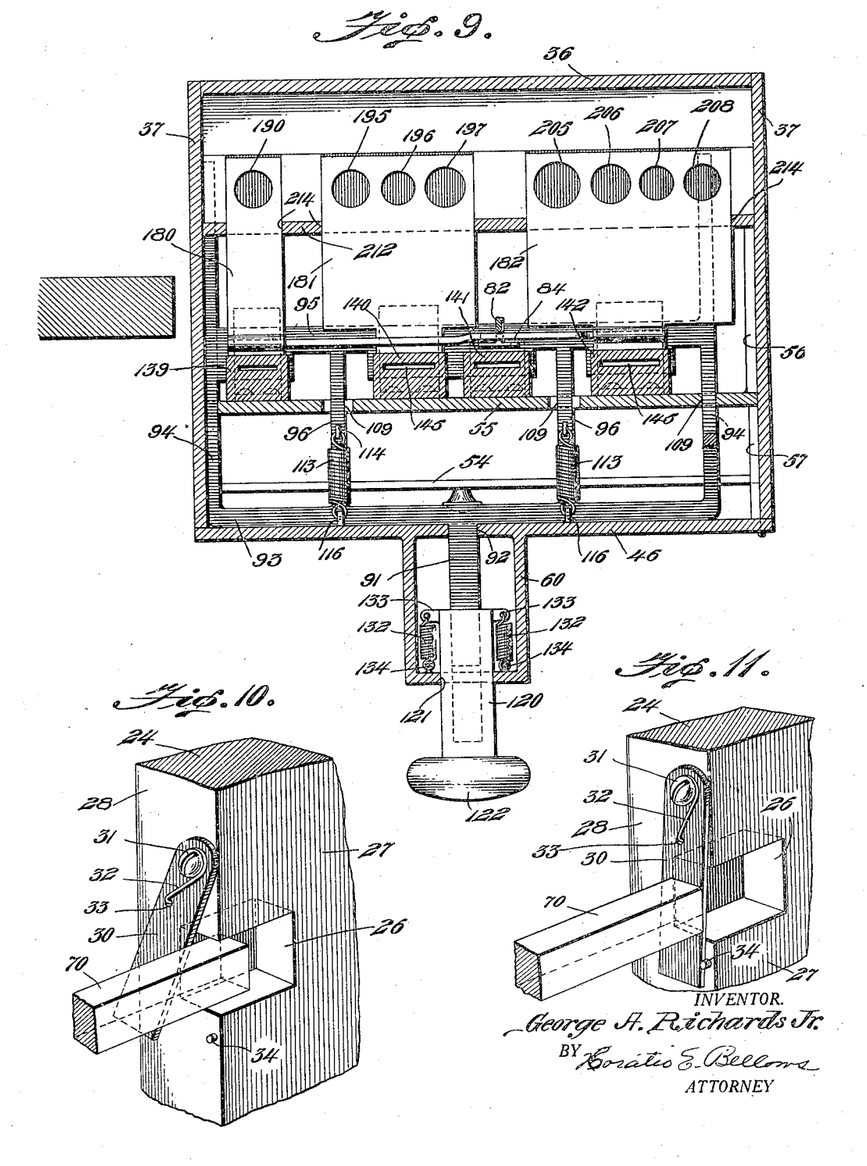

My device is adapted to control a revolving door, turnstile or the like. In this instance there is shown let into the wall 20 a frame 21 enclosing a stile comprising the post 22, loose sleeve 23, and doors or wings 24. Each of the latter has in its margin a rectangular recess 26 opening to the rear and end faces 27 and 28 respectively of the door, as shown in Figures 2, 10, and 11. Normally covering the end of this opening is a depending plate 30, pivoted at its upper end to a screw 31 in the door face 28. A spring 32 fast to the screw has one end in a hole 33 and presses the plate against a stop pin 34.

Fastened to the wall 20 and frame 21 in any convenient manner is the frame work or casing of my collecting mechanism which may be of any form best adapted for carrying the operative parts. In the form thereof herein shown it comprises a bottom 35 inclined downwardly and forwardly from a rear wall 36 and embraced by side walls 37. The rear wall is broken by a horizontal portion 38, above which is a door or removable section 39 below the casing top 42. The front wall which is preferably attached by screws or otherwise to enable removal, extends downwardly, as at 44, then outwardly as at 45, and downwardly as at 46, below which is a door 47. There is an opening 48 intermediate the door and the upper edge of a vertical flange 49 upon the bottom 35 which forms therewith a coin trough 50. Spaced from the back wall 36 is a vertical longitudinal portion 51 fast to the end walls, and extending forwardly from its bottom edge is a horizontal partition 52 which supports a drawer 54 having an open top. An auxiliary removable frame has a front wall 55 and side walls 56 resting on cleats 57. There is also fast to the wall 51 a horizontal supporting strip 58. Centrally of the front wall 46 is a rectangular extension 60. For access to the drawer 54 the front section 47 is preferably fixed to the side walls 37 by removable screws, or said section may be hinged at one end as at 62.

Figure 8:
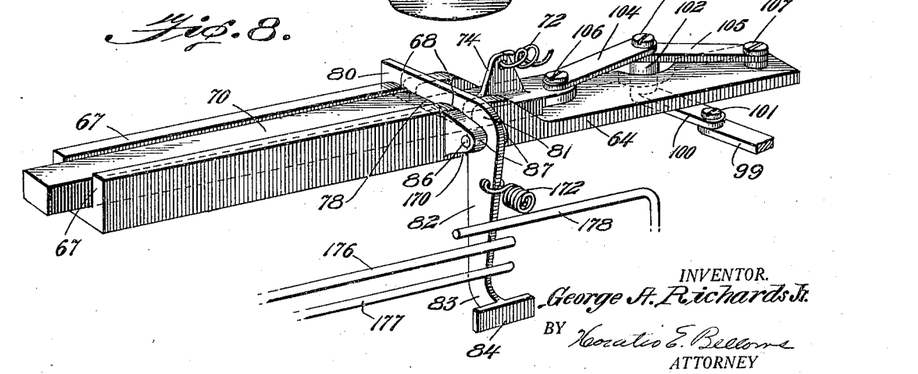

Extending lengthwise of an intermediate portion of the casing is a supporting plate 64 fast in the side walls, one of which is provided with an adjacent opening 65. A portion of the plate 64 has vertical guide flanges 67 provided with transverse vertical slots 68 (Fig. 8). Slidably mounted in the described guideway is a bolt 70 extending loosely through the opening 65, and through an opening 71 (Fig. 2) in the stile frame 21 to enable registration in the recess 26.

The bolt is reciprocable. A spring 72, attached at one end to a lug 74 on the bolt and at its other end to a projection 76 on the casing wall, impels the bolt away from the stile; and certain lever mechanism throws the bolt outwardly to its opposite or stile securing position. In order to maintain the bolt in its outermost position the latter has a transverse shoulder 78 in its upper face adapted to receive the lower edge of a horizontal arm 80 of a locking lever 81 of bell crank type whose second or depending arm 82 is forwardly bent, as at 83, and terminates in a broad foot or plate 84. A pintle 86 in this lever is journaled in lateral lugs 87 on one wall 67 at opposite sides of the slot 68.

Figure 4:
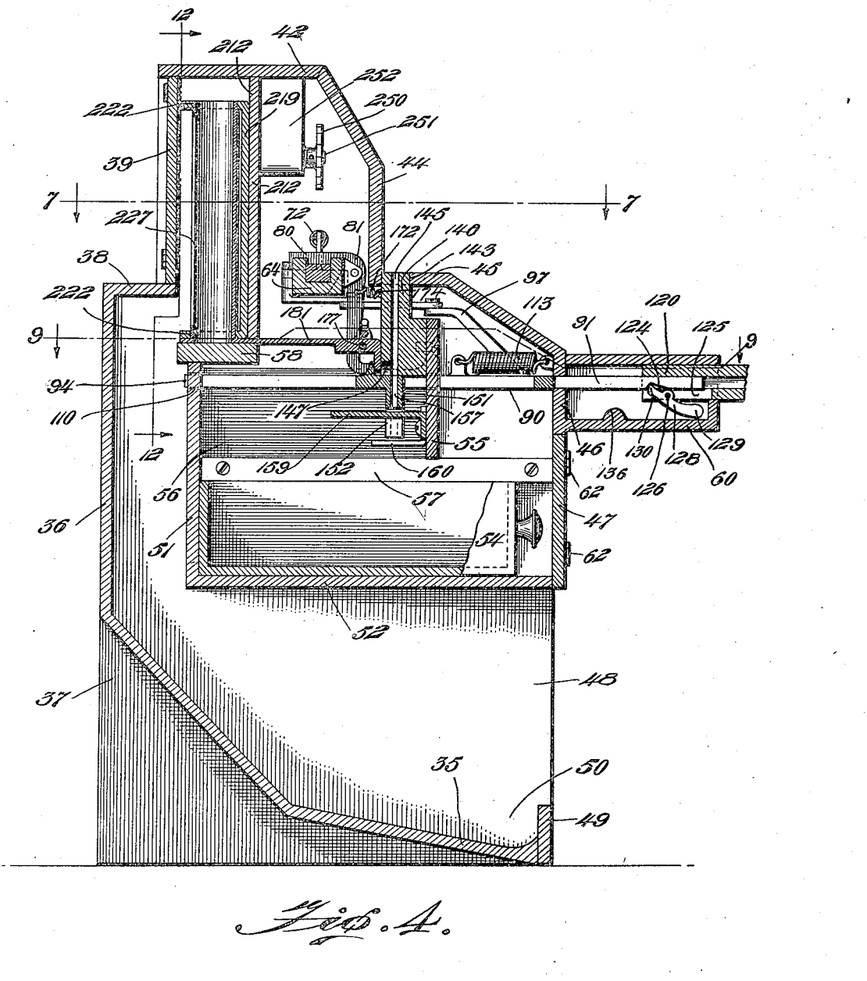

The mechanism for outwardly impelling the bolt includes a slide or slidable frame 90 (Fig. 6) comprising a handle or shaft 91 passing through an opening 92 (Fig. 9) in the casing portion 46, a front bar 93, rearwardly directed end bars 94, an intermediate cross bar 95, and bars 96 connecting the latter with the front bar. An elevated arm 97 on one bar 94 has, pivoted by a pin 98 (Fig. 7) in its end, a link or lever 99 pivoted to the outer end of a link or lever 100 (Fig. 8) by a pivot member 101. In an integral sleeve 102 upon the link 100 is a member 103 to which are pivoted at their inner ends links 104 and 105. The link 104 has its other end pivoted by a pin 106 to the rear end of the bolt 70; and the link 105 has its outer end pivoted by a member 107 to the outer end of the plate 64. The bars 94 and 96 are slidably supported in openings 109 (Fig. 9) in the wall 55, and ends of the bars 94 also pass through openings 110 (Figs. 4 and 5) in the partition 51. The slide 90 is normally maintained in outermost position with its bar 93 engaging the front of the casing by means of helical springs 113 attached at their inner ends to lugs 114 (Fig. 9) on the bars 96, and at their outer ends to lugs 116 on the casing. The springs 113 are more powerful than the spring 72. The effect of the operation of the slide 90 upon the bolt 70 through the link connections will be hereinafter described.

Figure 5:
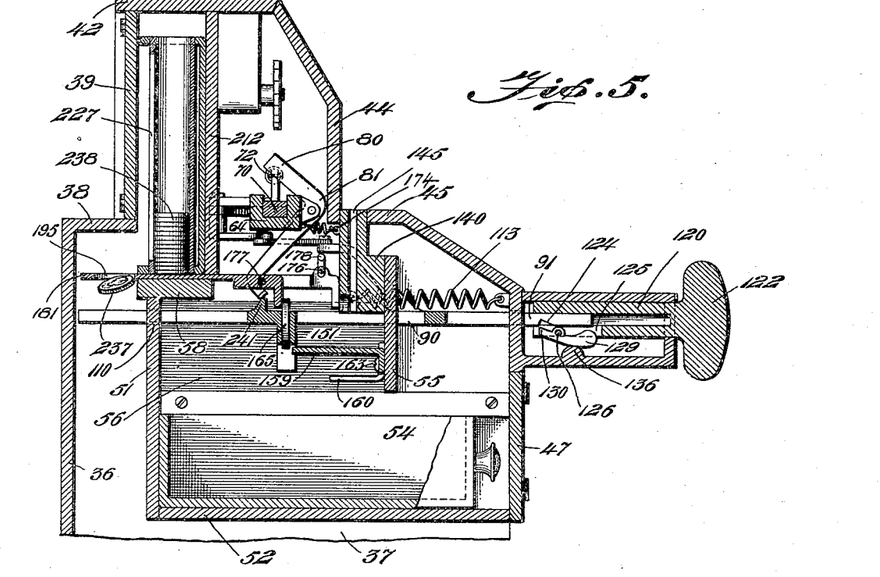

In this instance the handle of the frame 90 is sectional, that is the tang portion 91 thereof telescopes in a sleeve 120 (Fig. 5) extending through a hole 121 (Fig. 9) in the end of the extension 60 and carries a terminal head 122. The tang 91 has an inclined notch 124, (Figs. 4 to 6) and the sleeve 120 has a longitudinal slot 125. On a pin 126 in the sleeve 120 transversely of the slot is pivoted a gravity pawl 128 whose weighted lower end 129 normally maintains its tooth 130 in the cavity 124. The sleeve is forced outwardly by helical springs 132 (Fig. 9) attached at their inner ends to lateral lugs 133 on the sleeve, and at their outer ends to lugs 134 on the end of the extension 60. By inwardly pressing the knob 122 the section 91 is forced rearwardly until the tail of the pawl rides upon a projection 136 on the extension, as shown in Figure 5, whereupon the springs 113 force the released portion 91 back to initial position.

Figure 6:
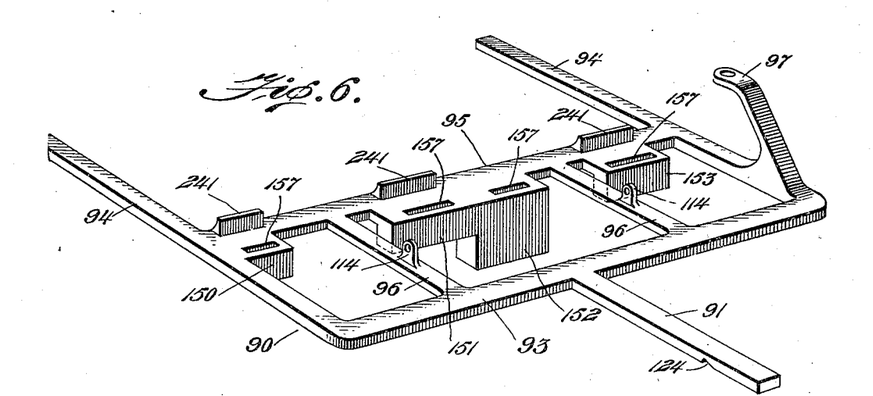
Figure 14:
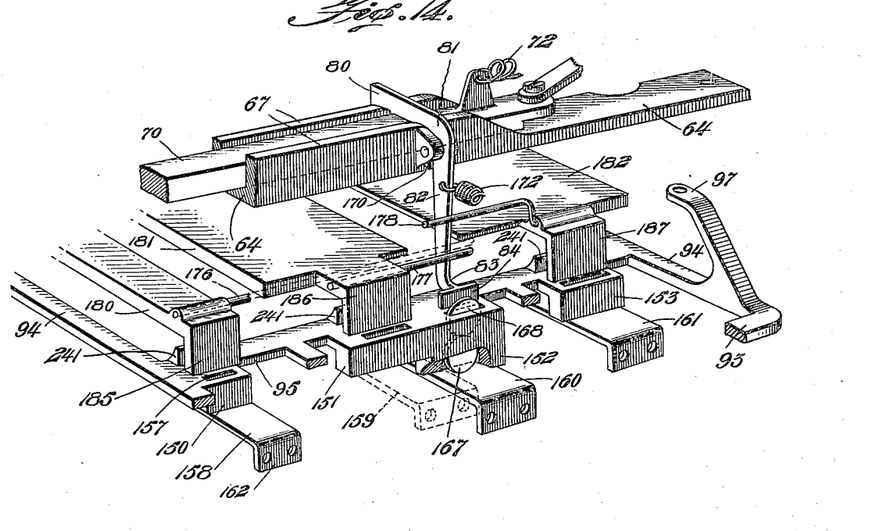
Figure 15:
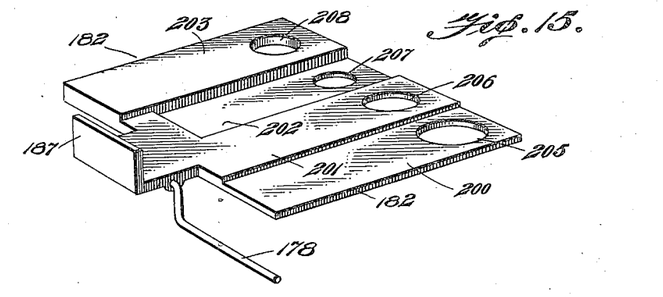
Figure 16:
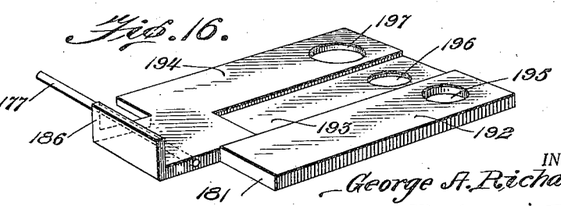

The bolt 70, which is normally maintained locked by the lever 81 is released or tripped by the following means. Integral with or fixed to the rear face of the wall or plate 55 by screws 137 (Fig. 3) or otherwise are, in this instance, four coin chutes comprising vertical blocks 139, 140, 141 and 142, extending vertically through openings 143, (Fig. 4) in the casing portion 45 and provided respectively with coin slots 145. The lower rear portion of each block is cut away to form an arcuate opening 147 to permit egress of the coin from the channel or slot. These slots are, from left to right, successively intended for the insertion of a dime, a quarter dollar, a nickel, a penny as a changeless fare, and a half dollar. Integral with the forward margin of the bar 95 of the slide, as shown in Figure 6 are forwardly and downwardly directed extensions or coin chutes 150, 151, 152, and 153 each provided with a vertical coin slot 157, open at top and bottom, and registering from left to right successively with the slots of chutes 139, 140, 141, and 142. The extension 152 is integral with the extension 151, and practically forms a single extension except that the slotted portion of the extension 152 depends below that of the corresponding portion of 151. Flat coin arresting plates 158, 159, 160 and 161 (Fig. 14) have their bent ends 162 attached by screws 163 (Fig. 5) or otherwise to the plate 55, and project rearwardly adjacent or in slidable contact with the bottom faces of the extensions 150, 151, 152, and 153 respectively, thus closing the coin slots 157. The plate 160 is shorter than the companion plates. It will be observed by reference to Figure 4 that a coin inserted into the slot of the chute would pass into its registering slot 157 in the auxiliary chute when the slide 90 is in normal position. When the slide 90 is inwardly pressed, as in Figure 5, a coin 165 would be carried beyond the end of its supporting plate 159 and would ultimately drop into the drawer below. In Figure 14 the slot of the extension 152 contains a nickel 167 and penny 168, the plurality of coins in this instance accounting for the increased depth of the extension. The inward impulse of the slide above referred to presses the top of the coin 168 against the foot 84 of the locking lever and rocks the arm 82 rearwardly, the plate 64 being undercut as at 170 to afford clearance for the arm, and elevates the arm 80 out of the shoulder 78 to release the bolt 70 which is retracted from its stile seat by the spring 72. The lever 81 is normally retained in locked position by the pressure exerted on the arm 80 by a retractile spring 172 attached at one end to the arm 82 and at its other end to a ring 174 on the chute 141. The extension 152 being immediately in front of the lever arm 82; the coin or coins carried thereby act directly upon its foot 84, but when the coin is carried in the slot of any of the other extensions the coins operate the lever arm indirectly through contact rods 176, 177, and 178 (Figs. 8 and 14) fast in the forward portions of coin ejecting slides 180, 181, and 182 respectively, and normally in front of or in contact with the lever arm 82. The last mentioned slides have respectively depending lugs 185, 186 and 187 normally overhanging the extensions 150, 151, and 153 behind the coin slots and contiguous with the backs of the upper coin chutes, so that as the operating slide 90 moves inwardly the coin 165 carried thereby moves its corresponding slide rearwardly and its contact rod tilts the lever 81.

Figure 12:
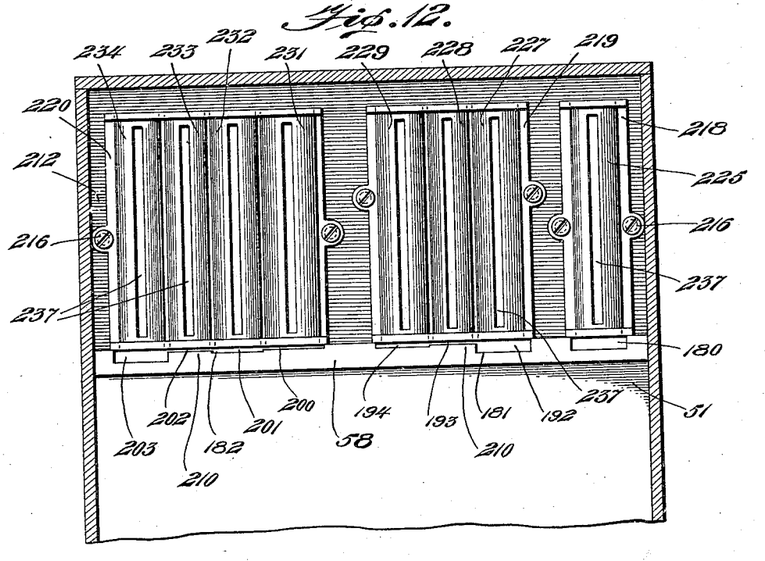
Figure 13:
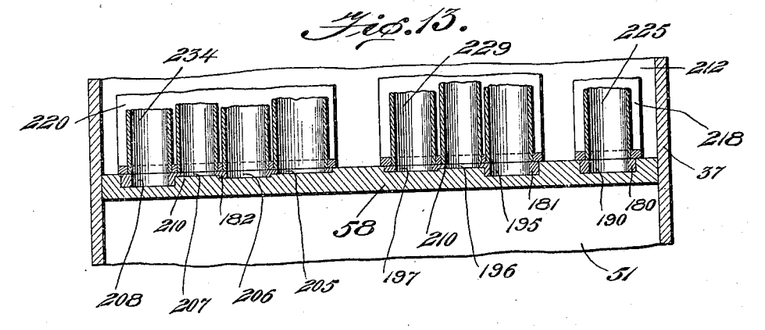

The coin ejecting slides function also to deliver change for coins in excess of the value of the fare. They move transversely of the strip or plate 58. The slide 180 (Figs. 9, 12 and 13) has near its outer end a coin opening 190 of a depth equal to the thickness of four pennies. The slide 181 is provided upon its bottom with longitudinal flat shoulders dividing the slide into areas 192, 193, and 194 of varying thicknesses provided near their ends with coin openings 195, 196, and 197 respectively. The first opening is the depth of four pennies, the second of a dime; and the third of a nickel. The slide 182 has its lower face divided by longitudinal shoulders into areas 200, 201, 202, and 203 of differing thickness having coin openings 205, 206, 207, and 208 respectively near their outer ends. The first opening has a depth of a quarter of a dollar; the second, of a nickel; the third, of a dime; and the fourth, of four pennies. The bar or plate 58 is provided with series of transverse shoulders 210 of varying heights to receive the shoulders upon the coin slides so that the upper faces of the latter lie in the same horizontal plane. The coin openings of the slides normally are in alignment with each other and over the plate 58 which forms a temporary closure or floor for the openings converting them into pockets. A vertical partition 212 fast to the walls 37 and spaced from the casing door 39 contacts with the plate 58 and has in its bottom slots 214 to permit passage of the coin selecting slides. To the rear face of this partition are fixed side by side by screws 216 or otherwise three open frames 218, 219, and 220. Fast in holes 222 in the tops and bottoms of the frames are vertical coin tubes or stacks. One tube 225 is mounted in the frame 218 above the coin opening 190; tubes 227, 228 and 229 are in frame 219 registering with coin openings 195, 196, and 197; and tubes 231, 232, 233, and 234 are above the openings 205, 206, 207, and 208 respectively. The tubes are preferably provided with vertical sight slots 237. Into the open tops of the tubes are inserted coins as follows; pennies in tubes 225, 227, and 234; nickels in tubes 229 and 232; dimes in tubes 228 and 233; and quarters in tube 231. The bottom coin of each coin stack enters by gravity, as the slides pass, a corresponding coin opening, except that the bottom four pennies of the stack enter the coin openings 190, 195, and 208. When a coin slide has passed beyond the plate 58, as shown in Figure 5, its coin 237 detached from its coin mass 238 drops by gravity. The dropped coin or coins fall into the coin trough 50. Assuming, as in this instance, that the toll or fare is 6 cents, a dime inserted in chute 139 produces 4 cents change; a quarter in chute 140 renders 19 cents; the nickel and one penny, in chute 141 returns no change; and the half dollar, in chute 142 returns 44 cents in change. The slide springs 113 return the advanced slide to place, through one of the three upright shoulders 241 (Fig. 14) on the slide cross bar 95 located behind the several depending lugs 185, 186 and 187 and in alignment therewith.

Figure 3:
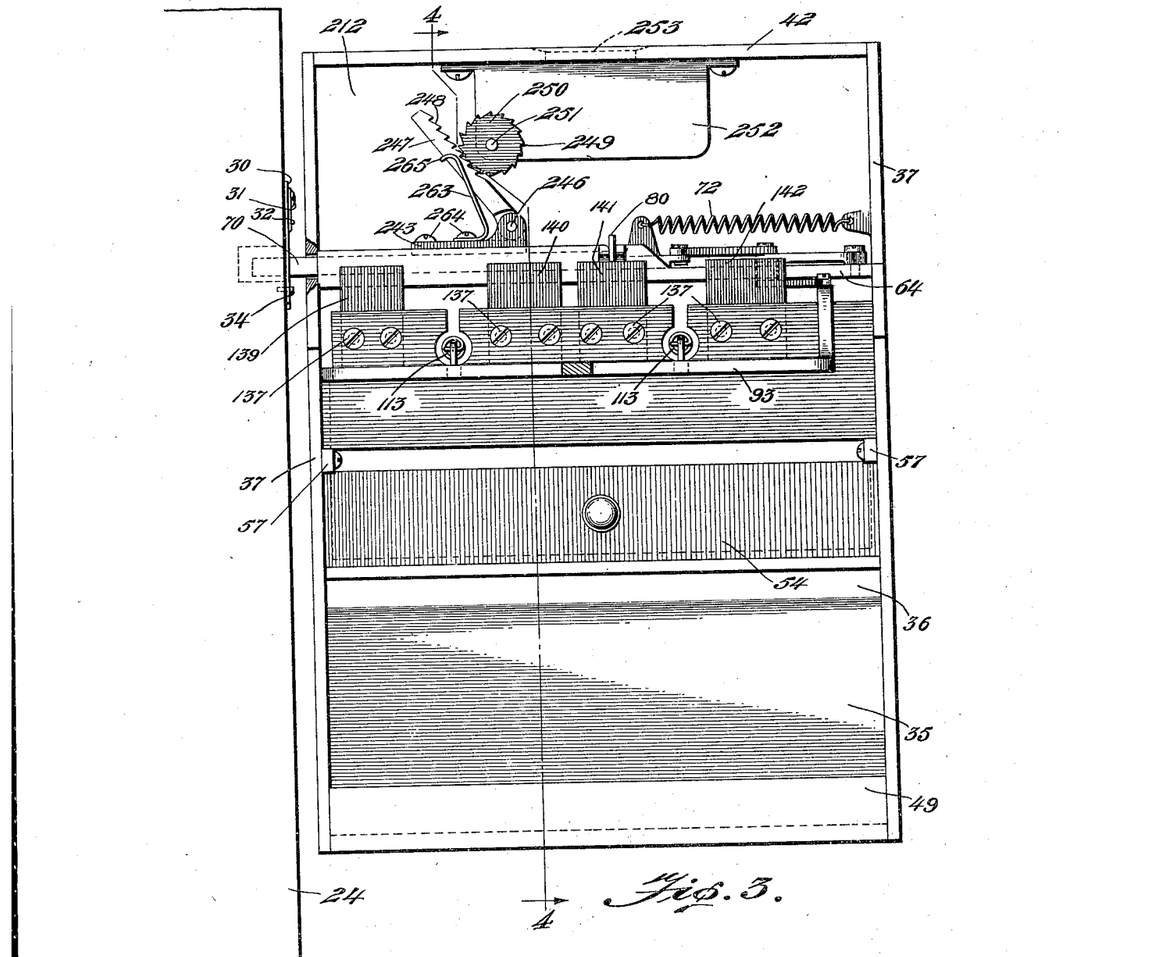
Figure 7:
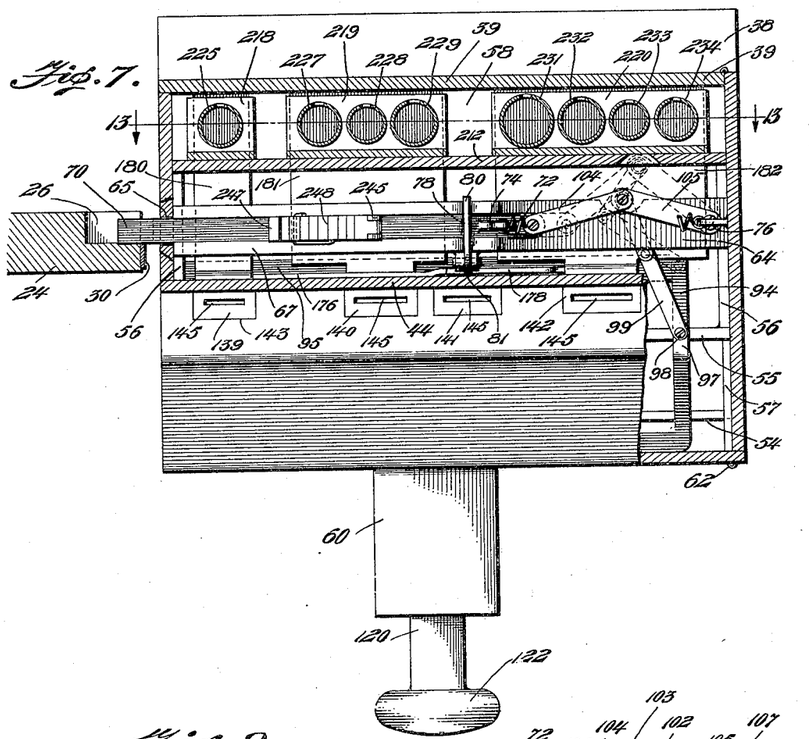

A device for registering the number of patrons comprises, as shown in Figures 3 and 7, a plate 243 fast to the bolt 70 which has ears 245 carrying a pintle 246 on which is pivotally mounted an arm or rack 247 having inclined lateral teeth 248 engaging the teeth 249 of a ratchet 250 fast to the operating shaft 251 of a registering device or counter mechanism 252 of any usual construction, attached to the casing top 42, in which is the usual sight opening 253. A spring arm 263 is fast at its lower end to the plate 243 by screws 264, and a loop 265 on its upper end slidably embraces the lower edge of the arm 247 and maintains the arm in contact with the ratchet. Each movement of the bolt 70 to the right therefore rotates the operating shaft a fraction of a revolution to advance a new numeral, but the return of the bolt exerts no influence on the operating shaft.

The general operation of my device is as follows. The patron on approaching the stile inserts his coin in the slot of the appropriate chute and presses the handle 120 inwardly, which advances the slide 90 and the coin slides to coin discharging position which occurs approximately the time the pawl 128 releases the handle 91, and the slide 90 is returned to place immediately by the springs 113 so that it is impossible to maintain the stile unlocked for a lengthy period by prolonging pressure on the handle. The described advance of the operating slide elevates the lock lever 81 and the bolt 70 is thereupon drawn from its recess 26 to the right under the influence of spring 72 into the position shown in broken lines in Figure 7, thus folding the links or levers 104 and 105. Immediately, however, upon the return of the slide 90 under the influence of springs 113, which are more powerful than the spring 72, the members 104 and 105 have their pivoted adjacent ends drawn forwardly from an acute angle to an obtuse angle, which forces the bolt 70 outwardly until its shoulder 78 reaches the lever 81 whereupon the arm 80 thereof is forced by the spring 172 into the slot, and the bolt is thereby held in locked position. When the guard plates 30 are present the recess 26 in the stile is closed against a return of the bolt into the recess immediately after its withdrawal.

In the illustration of my invention the amount of toll is assumed as six cents, but it will be understood that any desired toll may be employed, the depth of the coin selecting slide openings varying according to the denominations and numbers of the coins called for in change, and according to the number of stacks.

It is to be understood that the invention is not limited to the specific form herein illustrated and described, but may be embodied in other forms without departure from its spirit as defined by the following claims.

I claim:—

1. In a device of the character set forth, a reciprocatory bolt, a spring for moving the bolt in one direction, an operating slide for moving the bolt in the opposite direction, stacks for toll excess coins, slides for ejecting coins from said stacks, and coin controlled toll coin receptacles carried by the operating slide for actuating the coin ejecting slides.

2. In a device of the character set forth, a slidable bolt, a spring for retracting the same, a reciprocatory rock lever movable into and out of engagement with the bolt for normally retaining the bolt against the action of the spring, and coin controlled means actuating the lever for advancing the bolt to original position after retraction.

3. In a device of the character set forth, a slidable bolt, a spring for retracting the same, a rock lever normally retaining the bolt against the action of the spring, foldable links engaging the bolt adapted when unfolded to return the retracted bolt to original position, and a coin controlled reciprocable slide movable in one direction to rock the lever to release the bolt, and movable in a reverse direction to unfold the links.

4. In a device of the character set forth, a reciprocable bolt provided with a shoulder, a spring for retracting the bolt in one direction, a rock lever slidably engaging the bolt adapted to contact with the shoulder when the bolt is advanced in the opposite direction, and coin controlled means for advancing the bolt.

5. In a device of the character set forth, a slidable locking bolt, a reciprocatory coin ejecting slide, a coin stack, superposed coins in the stack in the path of the slide, and coin controlled means actuating the coin ejecting slide for operating the bolt.

6. In a device of the character set forth, a slidable bolt, means for retracting the bolt, a lever normally engaging the bolt to retain it against retraction, a reciprocable member engageable with the lever to release the bolt, a coin stack, a reciprocable coin ejecting slide movable transversely of the stack and carrying the bolt releasing member, and coin controlled means for actuating the slide.

7. In a device of the character set forth, a coin chute adapted to receive a toll coin, a slidable locking bolt, stacks for containing excess toll coins, a slide for ejecting the excess toll coins from the stacks and means controlled by a toll coin and actuating the bolt for operating the slide.

8. In a device of the character set forth, a coin chute, a reciprocable operating slide below the chute, a coin receptacle on the slide movable in alignment with the chute provided with a bottomless coin slot, and a stationary finger below the receptacle disposed in the direction of the movement of the slide and transversely of the slot adapted to sustain a coin in the receptacle until the receptacle passes beyond the end of the finger.

9. In a device of the character set forth, a slidable locking bolt, a registering device actuated thereby, a reciprocatory coin ejecting slide, a coin stack, superposed coins in the stack in the path of the slide, and coin controlled means actuating the coin ejecting slide for operating the bolt.

10. In a device of the character set forth, a casing comprising a base, a back, side walls, a top provided with openings for coin chutes, a front wall provided with an opening, and a trough extending inwardly from said opening, a coin compartment extending inwardly from the front wall above the trough, vertical coin chutes in the casing extending into the openings in the top, an operating slide mounted in the front wall, coin receptacles on the slide registerable with the chutes and movable above the coin compartments to discharge toll coins therein, a vertical partition between the walls of the casing, excess toll coin stacks fast to the partitions, a slide supporting strip below the stacks, and coin ejecting slides on the strip actuated by the operating slide and controlled by a toll coin adapted to eject excess toll coins from the stacks and precipitate the same into the trough.

In testimony whereof I have affixed my signature.

GEORGE A. RICHARDS, Jr.